United States Patent
Sugiyama et al.

(10) Patent No.: US 7,879,476 B2
(45) Date of Patent: Feb. 1, 2011

(54) PROTON CONDUCTING ELECTROLYTE

(75) Inventors: Yuichiro Sugiyama, Aichi (JP); Hisashi Yamamoto, Chicago, IL (US)

(73) Assignees: Toyota Motor Engineering & Manufacturing North America, Inc., Erlanger, KY (US); University of Chicago, Chicago, IL (US)

( * ) Notice: Subject to any disclaimer, the term of this patent is extended or adjusted under 35 U.S.C. 154(b) by 443 days.

(21) Appl. No.: 11/745,834

(22) Filed: May 8, 2007

(65) Prior Publication Data

US 2009/0029223 A1 Jan. 29, 2009

(51) Int. Cl.
H01M 8/10 (2006.01)
(52) U.S. Cl. .......................... 429/33; 521/27
(58) Field of Classification Search ................ 521/27; 429/33
See application file for complete search history.

(56) References Cited

U.S. PATENT DOCUMENTS

| | | | |
|---|---|---|---|
| 5,512,391 A | 4/1996 | Fleischer | |
| 5,580,681 A | 12/1996 | Fleischer | |
| 5,716,727 A | 2/1998 | Savinell et al. | |
| 5,731,105 A | 3/1998 | Fleischer et al. | |
| 6,025,085 A | 2/2000 | Savinell et al. | |
| 6,099,988 A | 8/2000 | Savinell et al. | |
| 6,225,009 B1 * | 5/2001 | Fleischer et al. | ............ 429/306 |
| 2002/0122980 A1 | 9/2002 | Fleischer et al. | |

FOREIGN PATENT DOCUMENTS

| | | |
|---|---|---|
| EP | 0551938 B1 | 7/1993 |
| WO | WO-97/37396 | 10/1997 |

OTHER PUBLICATIONS

Jeong, J.K. et al. "A novel π-conjugated polymer : poly (3,4-bis(phenylene)-3-cyclobutene-1,2-dione)", Polymer Bulletin, 42(2), pp. 183-190. Mar. 31, 1999.

Duan, X. et al. "Reduction processes of aromatic-bis(squarate)s", Journal of Molecular Structure: THEOCHEM, 529(1-3), pp. 161-171. Sep. 8, 2000.

Hasiotis, C. et al. "Development and Characterization of Acid-Doped Polybenzimidazole/Sulfonated Polysulfone Blend Polymer Electrolytes for Fuel Cells", J. Electrochemical Society, 148(5), pp. A513-A519. May 31, 2001.

* cited by examiner

*Primary Examiner*—Michael M Bernshteyn
(74) *Attorney, Agent, or Firm*—Gifford, Krass, Sprinkle, Anderson & Citkowski, P.C.

(57) ABSTRACT

A cationic conductive polymer is described herein which generally comprises a proton donating polymer and an oxocarbonic acid. The cationic conductive polymer exhibits a high conductivity in low humidity environments.

24 Claims, 2 Drawing Sheets

PROTON CONDUCTING ELECTROLYTE

FIELD OF THE INVENTION

The present invention generally relates to cationic conductive polymers. More particularly, the present invention relates to cationic conductive polymers for use in fuel cells.

BACKGROUND

A fuel cell is an energy conversion device which electrochemically reacts fuels such as hydrogen and oxygen to produce an electrical current. One particular type of a fuel cell is a Proton Exchange Membrane (PEM) fuel cell. PEM fuel cells have an operating temperature of around 80° C. which makes them favorable for a number of applications, particularly automotive applications.

A PEM fuel cell generally comprises one or more electrically connected membrane electrode assemblies (MEA). Each MEA comprises an anode and a cathode separated by a solid electrolyte allowing for the transfer of protons there through. The solid electrolyte is typically in the form of a membrane. The MEAs are disposed between flow fields which provide for distribution of hydrogen across the surface of the anode opposite the membrane and the distribution of oxygen across the surface of the cathode opposite the membrane. To catalyze the reactions at the anode and cathode, catalysts are deposited on the surfaces of the electrodes. A typical catalyst used in PEM fuel cells is platinum.

During operation, hydrogen is supplied to the anode and oxygen is supplied to the cathode to produce an electrical current. The hydrogen and oxygen react at the appropriate electrodes via the following reactions:

Anode: $2H_2 \rightarrow 4H^+ + 4e^-$

Cathode: $O_2 + 4H^+ + 4e^- \rightarrow 2H_2O$

Overall: $2H_2 + O_2 \rightarrow 2H_2O + e^-$

At the anode, hydrogen is dissociated into hydrogen ions and electrons. The hydrogen ions permeate through the membrane to the cathode, while the electrons flow through an external circuit to the cathode. At the cathode, oxygen reacts with the hydrogen ions and electrons to form water. The flow of electrons from the anode to the cathode via the external circuit may be used as a source of power.

The solid electrolyte as utilized in PEM fuel cells is an acidic cationic conductive polymer. The acidity of the polymer allows the transfer of protons from the anode to the cathode while preventing the transfer of electrons therethrough. Sulfonated fluoropolymers are the most popular choice for the acidic cationic conductive polymers used in PEM fuel cells. One of the most popular of these conductive polymers is Nafion® (registered trademark of DuPont). The popularity of sulfonated fluoropolymers is due to their high chemical resistivity, ability to be formed into very thin membranes, and high conductivity due to their ability to absorb water. The ability of the sulfonated fluoropolymers to absorb large quantities of water is due to the hydrophilic nature of the sulfonic groups within the polymer. The sulfonic groups provide for the creation of hydrated regions within the polymer, which allow the hydrogen ions to move more freely through the polymer due to a weaker attraction to the sulfonic group. The weaker attraction between the hydrogen ions and the sulfonic groups increases the conductivity of the polymer thereby increasing performance of the fuel cell. As such, the conductivity of the hydrogen ions is directly proportional to the amount of hydration of the sulfonated fluoropolymer.

With the hydration of the electrolyte being an important consideration in PEM fuel cells, the humidity of the air in a PEM fuel cell must be carefully monitored and controlled. If the air has too high of a humidity, the cell can become flooded with water created during operation of the fuel ceil resulting in a decrease in performance due to clogging of the electrode pores. If the air has too low of a humidity, the electrolyte may dry out thereby decreasing the conductivity of the electrolyte resulting in decreased fuel cell performance. As such, control systems and humidification systems must be used in conjunction with PEM fuel cells. The use of these systems can adversely affect the cost, size, and mass of PEM fuel cell systems. As such, there is a need in the art for cationic conductive polymers which provide high conductivity in low humidity environments.

SUMMARY OF THE INVENTION

Described herein, is a cationic conductive polymer comprising a proton donating polymer and an oxocarbonic acid. The oxocarbonic acid may comprise one or more acids selected from the group consisting of Squaric Acid, Delta acid, Croconic acid, and Rhodizonic acid. The cationic conductive polymer may exhibit a cationic conductivity greater than 0.020 S/cm at a relative humidity less than 25% at temperatures in the range of 20° C. to 120° C. The proton donating polymer may comprises a sulfonic acid group. The cationic conductive polymer may comprise sulfonated polysulfone. Other proton donating polymers that may be used in accordance with the present invention include sulfonated polyether ketones, sulfonated polystyrenes, sulfonated polyphenylenes, sulfonated trifluorostyrenes, sulfonated polyphosphazenes, sulfonated fluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof. The molar ratio of oxocarbonic acid to proton donating groups of the proton donating polymer may be in the range of 0.1 to 2.0, preferably in the range of 0.25 to 0.75.

Also described herein is a fuel cell comprising an anode, a cathode, and a cationic conductive polymer comprising a proton donating polymer and an oxocarbonic acid. The oxocarbonic acid may comprise one or more acids selected from the group consisting of Squaric Acid, Delta acid. Croconic acid, and Rhodizonic acid. The cationic conductive polymer may exhibit a cationic conductivity greater than 0.020 S/cm at a relative humidity less than 25% at temperatures in the range of 20° C. to 120° C. The proton donating polymer may comprises a sulfonic acid group. The cationic conductive polymer may comprise sulfonated polysulfone. Other proton donating polymers that may be used in accordance with the present invention include sulfonated polyether ketones, sulfonated polystyrenes, sulfonated polyphenylenes, sulfonated trifluorostyrenes, sulfonated polyphosphazenes, sulfonated fluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof. The molar ratio of oxocarbonic acid to proton donating groups of the proton donating polymer may be in the range of 0.1 to 2.0, preferably in the range of 0.25 to 0.75.

DETAILED DESCRIPTION OF THE DRAWINGS

DETAILED DESCRIPTION OF THE PREFERRED EMBODIMENTS OF THE INVENTION

Described herein, is a conductive polymer which allows for the transfer of protons therethrough. The conductive polymer may be used as the electrolyte in a fuel cell such as a PEM fuel cell, a direct methanol fuel cell, or any other type fuel cell that utilizes a proton conducting membrane as the electrolyte. The conductive polymer provides for high proton conductivity in low humidity environments.

The proton conducting polymer generally comprises a proton donating polymer and an oxocarbonic acid. The proton conducting polymer may be doped with the oxocarbonic acid. The oxocarbonic acid may be selected from one or more of the following:

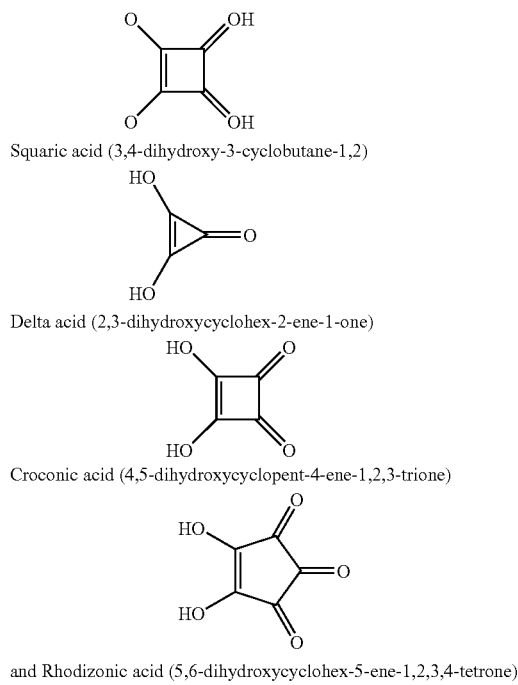

Squaric acid (3,4-dihydroxy-3-cyclobutane-1,2)

Delta acid (2,3-dihydroxycyclohex-2-ene-1-one)

Croconic acid (4,5-dihydroxycyclopent-4-ene-1,2,3-trione)

and Rhodizonic acid (5,6-dihydroxycyclohex-5-ene-1,2,3,4-tetrone)

The ratio of the proton donating polymer to oxocarbonic acid may be determined based on the molar ratio between the proton donating acid groups of the proton donating polymer and the oxocarbonic acid. Preferably the molar ratio between the proton donating acid groups and the oxocarbonic acid is in the range of 0.1 to 2.0, preferably in the range of 0.25 to 0.75.

The proton donating polymer may comprise a polymer including a sulfonic acid group or a phosphonic acid group. In particular, the proton donating polymer may comprise sulfonated polysulfone. Other proton donating polymers that may be used in accordance with the present invention include sulfonated polyether ketones, sulfonated polystyrenes, sulfonated polyphenylenes, sulfonated trifluorostyrenes, sulfonated polyphosphazenes, sulfonated fluoropolymers, polyphenyl sulfides, polymers containing one or more fluorinated sulfonamide groups, zwitterionic ionenes, ionomers, sulfonated polyamides, sulfonated polyazoles, sulfonated silicones, polybenzoimidazole doped with phosphoric acid, nafion, and any derivatives thereof. Preferably, the proton donating polymer has an ion exchange capacity greater than 1.0. More preferably, the proton donating polymer has an ion exchange capacity greater than 1.2.

Figure 1:
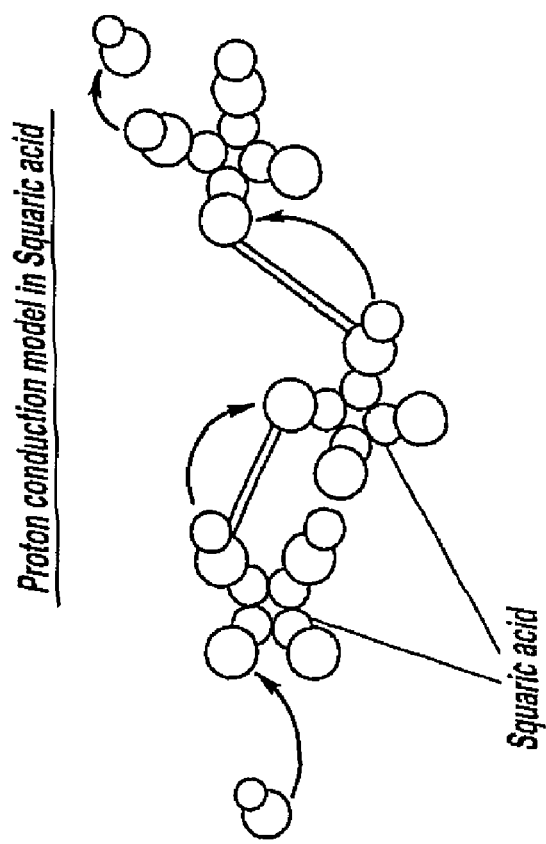
FIG. 1, is a depiction of the mechanism in accordance with the present invention.
Figure 1:
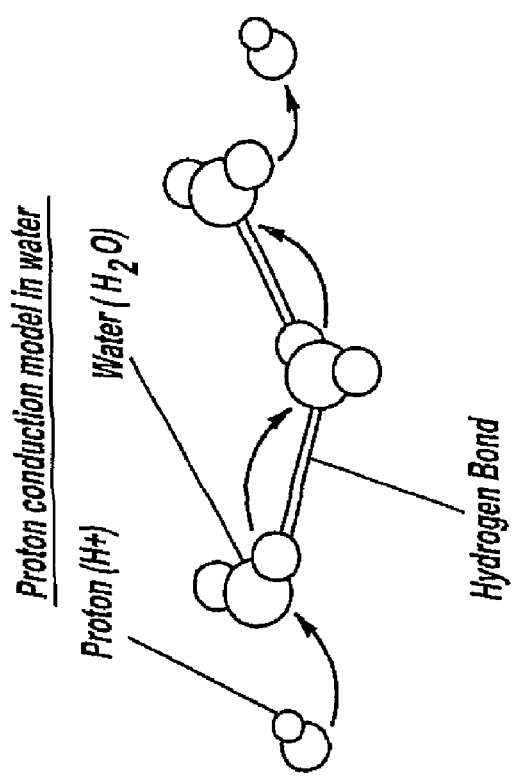

In general, water aids in proton transfer through an ion-exchange membrane. Water may aid in the transfer of protons through the ion-exchange membrane via the Grotthus mechanism by which protons move along the hydrogen bonds of water molecules. High acidity also aids in the transfer of protons through an ion-exchange membrane. Without being bound by theory, the present inventors believe that oxocarbonic acid provides for proton transfer in a manner similar to water which allows protons to travel along the hydrogen bonds of the oxocarbonic acid. A depiction of this mechanism is shown in FIG. 1. Furthermore, the oxocarbonic acid provides for increased acidity in the proton conducting polymer which further aids the transfer of proton therethrough.

The proton conducting polymer in accordance with the present invention may be prepared by mixing a proton donating polymer as described herein with an oxocarbonic acid. The proton donating polymer and the oxocarbonic acid may be in powder form and mechanically mixed together. The proton donating polymer and the oxocarbonic acid may also dissolved in solution and mixed together with the solvent being evaporated off to obtain the proton conducting polymer. The proton conducting polymer may also be obtained by dipping the proton donating polymer into an oxocarbonic acid solution with subsequent drying.

The proton conducting polymer may be formed into an ion-exchange membrane as used in electrochemical cells. To obtain an ion-exchange membrane with the proton conducting polymer, the proton donating polymer and the oxocarbonic acid may be combined in solution and allowed to dry. Typically, the proton donating polymer and the oxocarbonic acid may be dissolved in an organic solvent such as N,N-dimethylacetamide (DMAC) or dimethyl sulfoxide (DMSO). Some water may be added to the solution to aid in the dissolution of the Oxocarbonic acid. Once all of the proton donating polymer and the oxocarbonic acid are dissolved the solvent is evaporated off to obtain the film. The solution may be heated to aid in dissolution of the proton donating polymer and the oxocarbonic acid. An ion-exchange membrane including the proton conducting polymer may also be obtained by preparing a membrane with the proton donating polymer and impregnating the membrane with the oxocarbonic acid. The membrane may be impregnated with the oxocarbonic acid by dipping the membrane into a oxocarbonic acid solution with subsequent drying, spraying a oxocarbonic acid solution onto the membrane with subsequent drying, or any other generally known deposition techniques.

When utilized as the proton conducting electrolyte in a fuel cell, the proton conducting electrolyte may be formed into an ion-exchange membrane as previously discussed and incorporated into a fuel cell. When incorporated into a fuel cell, the ion-exchange membrane is disposed between and in electrochemical communication with an anode and a cathode. During operation of the fuel cell, protons are transferred through the ion-exchange membrane from the anode to the cathode while electrons are transferred through an external circuit from the anode to the cathode.

The ion-exchange membrane formed from the proton conducting polymer of the present invention may be utilized in a membrane electrode assembly (MEA). A MEA includes an anode, a cathode, and an ion-exchange membrane according disposed between the anode and cathode. One or more of the membrane electrode assemblies according to the present invention may be used in a fuel cell or other apparatus.

Example

A proton conducting polymer sample was prepared in accordance with the present invention. To prepare the polymer sample, 1.2 g of sulfonated polysulfone powder, 0.1 g of binder (PVA: polyvinylalcohol), and 0.8 g of squaric acid powder were mixed with 1 ml water. The mixture ratio between sulfonated polysulfone and the squaric acid were calculated on the basis oxocarbonic acid/—SO3H molecular ratio of 0.5. Additional water was 1-3 g, that was depended on the condition of samples. After the mixtures were prepared, the mixtures were dried to obtain powder samples.

Figure 2:
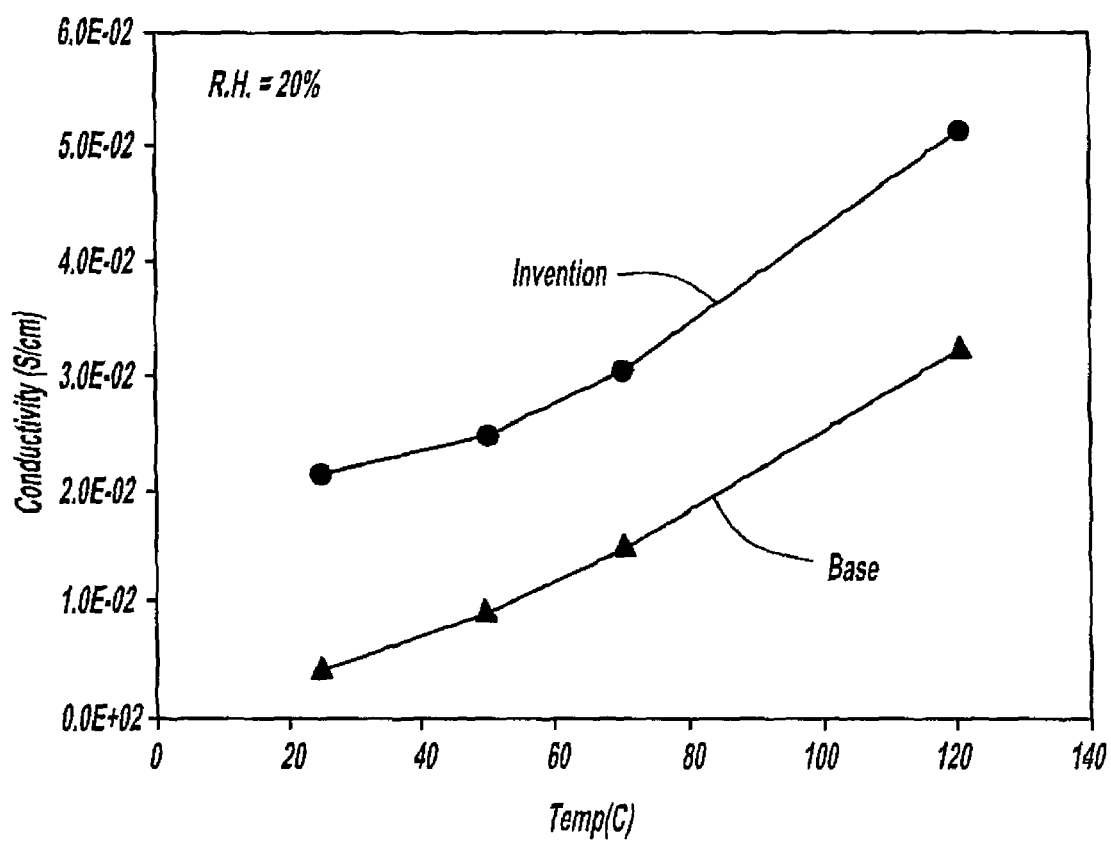
FIG. 2, is a plot showing the conductivity of the cationic conductive polymer in accordance with the present invention as compared to sulfonated polysulfone.

A testing pellet was created by die-casting approximately 0.5 g-1.0 g of prepared powder sample with a load was 1 t/cm². A second pellet was created by die-casting approximately 0.5 g to 1.0 g of powder sulfonated polysulfone. The pellets had a height of approximately 10 mm and a thickness of about 1.5 mm. Each pellet was separately placed in a temperature-humidity chamber which maintained a relative humidity of 20%. Ionic conductivity of the pellets were individually measured by the alternating current impedance (AC impedance) method. During testing, an electrical current was applied across each pellet via platinum electrodes in contact with the pellet. The ionic conductivity of the pellets were then measured at temperatures varying from 20° C. to 120° C. The results of the experiment are shown in FIG. 2.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A cationic conductive polymer allowing transfer of protons therethrough, the cationic conductive polymer comprising:
a proton donating polymer and an oxocarbonic acid wherein the molar ratio between the proton donating acid groups of said proton donating polymer and said oxocarbonic acid is in the range of 0.1 to 2.0.

2. The cationic conductive polymer according to claim 1, wherein said oxocarbonic acid is selected from the group consisting of Squaric Acid, Delta acid, Croconic acid, Rhodizonic acid, and mixtures thereof.

3. The cationic conductive polymer according to claim 1, wherein said oxocarbonic acid is Squaric acid.

4. The cationic conductive polymer according to claim 1, wherein said cationic conductive polymer exhibits a cationic conductivity greater than 0.020 S/cm at a relative humidity less than 25% at temperatures in the range of 20° C. to 120° C.

5. The cationic conductive polymer according to claim 1, wherein said proton donating polymer includes a sulfonic acid group.

6. The cationic conductive polymer according to claim 1, wherein said proton donating polymer comprises sulfonated polysulfone.

7. The cationic conductive polymer according to claim 1, wherein said proton donating polymer is selected from one or more from the group consisting of polyether ketones, sulfonated polystyrenes, sulfonated polyphenylenes, sulfonated trifluorostyrenes, sulfonated polyphosphazenes, fluoropolymers, fluorinated sulfonamides, zwitterionic ionenes, ionomers, sulfonated polysulfones, sulfonated polyamides, sulfonated polyazoles, sulfonated silicones, and polyimidazole.

8. The cationic conductive polymer according to claim 1, wherein the molar ratio between the proton donating acid groups of said proton donating polymer and said oxocarbonic acid is in the range of 0.25 to 0.75.

9. The cationic conductive polymer according to claim 1, wherein said proton donating polymer is doped with said oxocarbonic acid.

10. A cationic conductive polymer allowing transfer of protons therethrough between an anode and a cathode, the cationic conductive polymer comprising an oxocarbonic acid, said cationic conductive polymer having a cationic conductivity greater than 0.020 S/cm at a relative humidity less than 25% at temperatures in the range of 20 degrees Celsius to 120 degrees Celsius wherein the molar ratio between the proton donating acid groups of the proton donating polymer and the oxocarbonic acid is in the range of 0.1 to 2.0.

11. The cationic conductive polymer according to claim 10, wherein said oxocarbonic acid is selected from the group consisting of Squaric Acid, Delta acid, Croconic acid, and Rhodizonic acid.

12. The cationic conductive polymer according to claim 10, wherein said oxocarbonic acid is Squaric acid.

13. The cationic conductive polymer according to claim 10, wherein said proton donating polymer comprises sulfonated polysulfone.

14. The cationic conductive polymer according to claim 10, wherein the molar ratio between the proton donating acid groups of said proton donating polymer and said oxocarbonic acid is in the range of 0.01 to 2.0.

15. The cationic conductive polymer according to claim 10, wherein the molar ratio between the proton donating acid groups of said proton donating polymer and said oxocarbonic acid is in the range of 0.25 to 0.75.

16. The cationic conductive polymer according to claim 10, wherein said proton donating polymer is doped with said oxocarbonic acid.

17. An electrolyte membrane allowing transfer of protons therethrough, the electrolyte membrane comprising a proton donating polymer and an oxocarbonic acid wherein the molar ratio between the proton donating acid groups of said proton donating polymer and said oxocarbonic acid is in the range of 0.1 to 2.0.

18. The electrolyte membrane according to claim 17, wherein said oxocarbonic acid is selected from the group consisting of Squaric Acid, Delta acid, Croconic acid, and Rhodizonic acid.

19. The electrolyte membrane according to claim 17, wherein said oxocarbonic acid is Squaric acid.

20. The electrolyte membrane according to claim 17, wherein said cationic conductive polymer exhibits a cationic conductivity greater than 0.020 S/cm at a relative humidity less than 25% at temperatures in the range of 20 degrees Celsius to 120 degrees Celsius.

21. The electrolyte membrane according to claim 17, wherein said proton donating polymer comprises sulfonated polysulfone.

22. The electrolyte membrane according to claim 17, wherein the molar ratio between the proton donating acid groups of said proton donating polymer and said oxocarbonic acid is in the range of 0.1 to 2.0.

23. The electrolyte membrane according to claim 17, wherein the molar ratio between the proton donating acid groups of said proton donating polymer and said oxocarbonic acid is in the range of 0.25 to 0.75.

24. The electrolyte membrane according to claim 17, wherein said proton donating polymer is doped with said oxocarbonic acid.

* * * * *

UNITED STATES PATENT AND TRADEMARK OFFICE
CERTIFICATE OF CORRECTION

| | |
|---|---|
| PATENT NO. | : 7,879,476 B2 |
| APPLICATION NO. | : 11/745834 |
| DATED | : February 1, 2011 |
| INVENTOR(S) | : Yuichiro Sugiyama et al. |

It is certified that error appears in the above-identified patent and that said Letters Patent is hereby corrected as shown below:

Column 2, Line 51, Replace "Delta acid." with --Delta acid,--

Signed and Sealed this
Sixth Day of December, 2011

David J. Kappos
*Director of the United States Patent and Trademark Office*